United States Patent [19]

Warner

[11] 4,445,342
[45] May 1, 1984

[54] MULTI-ZONE TEMPERATURE CONTROL IN AIR CYCLE REFRIGERATION SYSTEMS

[75] Inventor: John L. Warner, Simsbury, Conn.

[73] Assignee: United Technologies Corporation, Hartford, Conn.

[21] Appl. No.: 412,046

[22] Filed: Aug. 26, 1982

[51] Int. Cl.³ .............................................. F28B 9/00
[52] U.S. Cl. ...................................... 62/172; 236/13
[58] Field of Search ................. 62/87, 172; 98/1.5; 236/13

[56] References Cited

U.S. PATENT DOCUMENTS

| | | | |
|---|---|---|---|
| 2,251,881 | 8/1941 | Danielson | 236/1 |
| 2,753,157 | 7/1956 | Hoyer | 257/3 |
| 2,885,187 | 5/1959 | Myck, Jr. | 257/3 |
| 2,937,011 | 5/1960 | Brahm | 98/1.5 X |
| 2,948,475 | 8/1960 | Beggs et al. | 236/13 |
| 2,977,051 | 3/1961 | Farkas et al. | 236/13 X |
| 3,355,905 | 12/1967 | Berhold et al. | 62/172 X |
| 3,508,604 | 4/1970 | Foust | 165/22 |
| 3,711,044 | 1/1973 | Matulich | 244/118 P |
| 4,013,118 | 3/1977 | Zimmer et al. | 165/22 |
| 4,086,781 | 5/1978 | Brody et al. | 62/180 |
| 4,192,455 | 3/1980 | Rasmussen et al. | 237/8 R |
| 4,198,830 | 4/1980 | Campbell | 62/87 |
| 4,200,910 | 4/1980 | Hall | 364/104 |
| 4,253,153 | 2/1981 | Bitterli et al. | 364/505 |
| 4,334,411 | 6/1982 | Payne | 62/172 X |
| 4,374,469 | 2/1983 | Rannenberg | 62/172 X |

*Primary Examiner*—William E. Tapolcai
*Attorney, Agent, or Firm*—John Swiatocha

[57] ABSTRACT

An air cycle refrigeration system (10) pressurizes and cools flight compartment (115) and cabin (120) by the provision of chilled air thereto. Trim valves (180) and (205) set by a common actuator (195) control the mixture of uncooled system inlet air with the chilled air for individual regulation of the temperatures of the cabin and flight compartment.

2 Claims, 2 Drawing Figures

MULTI-ZONE TEMPERATURE CONTROL IN AIR CYCLE REFRIGERATION SYSTEMS

DESCRIPTION

1. Technical Field

This invention relates to a turbine driven air cycle refrigeration system for providing pressurized cooling air to multiple zones such as the flight compartment and cabin of a transport aircraft.

2. Background Art

In the typical air cycle refrigeration system employed to pressurize and cool aircraft cabins or similar loads, system inlet (supply) air obtained from, for example, a gas turbine engine compressor is pressurized in the refrigeration system compressor, cooled by ambient air in a heat exchanger, and then fed to the system's turbine, work done on the turbine by the compressed air causing a cooling of the air which is then discharged to the load. The turbine is mechanically connected to the compressor such that work done on the turbine by the compressed air aids in driving the compressor rotor.

Pressurization and cooling of multiple zones by a single air cycle refrigeration system is sometimes required as, for example, where a single system must pressurize and cool the flight compartment (cockpit) and cabin of a transport aircraft. Heretofore, air conditioning of multiple zones has involved temperature control of both the total system airflow exhausted from the system's turbine and that portion of the airflow admitted into one of the zones. Temperature control of the remaining zone has, for the most part relied on the temperature control of the total turbine exhaust airflow. Such temperature control of the entire turbine exhaust airflow is typically achieved by simultaneous control of the total amount of airflow through the turbine (through the serially disposed compressor) as well as control of the amount of uncooled air mixed with the turbine exhaust prior to discharge into the air conditioned zones. In a somewhat similar fashion, control of the temperature of the one controlled zone has been effected in general by the controlled mixture of uncooled air with that portion of the chilled turbine exhaust which is discharged to that zone.

It will be noted that the cooling of the other (uncontrolled) zone is dependent on the cooling demands of the controlled zone and the control of the temperature of the main turbine exhaust. In modern transport aircraft, independent temperature control of two or more zones may be required. It may seem at first that an obvious solution would be the completely independent control in each zone of the mixture of uncooled air with cooled air discharged from the air conditioning system's turbine. Such independent control would require substantial duplication of system components (valves, controllers, actuators and the like) thereby adding substantially to the cost, weight, complexity and maintenance requirements of the system. Accordingly, independent temperature control of multiple zones without employment of separate trim valves and actuators has been sought.

DISCLOSURE OF INVENTION

It is therefore an object of the present invention to provide independent temperature control in multiple zones cooled by a single air cycle air conditioning system without necessitating individual controllers, trim valves and actuators therefor in each zone.

In accordance with the present invention, independent temperature control in two zones cooled by a single air conditioning system is achieved by providing each zone with a trim valve which controls the amount of uncooled air mixed with the cooled turbine air provided to the zone, the trim valves being driven by a single actuator which gradually opens each valve from a closed position thereof while the remaining valve is maintained in a closed position. The actuator responds to temperature conditions in only one of the zones. Control valve means controlling the temperature of the total system turbine exhaust flow is responsive to temperature conditions in the other zone. The operation of the actuator in the manner set forth herein enables the actuator to adjust the trim valve of one of the zones to provide, for example, cooler temperatures therein when demanded. When that trim valve is fully closed, further demand for cooler temperatures in that zone causes the actuator to continue its operation thereby opening the trim valve associated with the other zone to increase the flow of warm air thereto, thereby tending to elevate the temperature thereof. However, such temperature elevation is prevented by the control valve means which further cools the total exhaust of the air conditioning system's turbine thereby achieving the cooler temperatures desired in the one zone without disturbing the temperature maintained in the other zone. Thus, independent temperature regulation of the two zones is attained with only a single actuator for both of the trim valves associated with the zones.

BEST MODE FOR CARRYING OUT THE INVENTION

Figure 1:
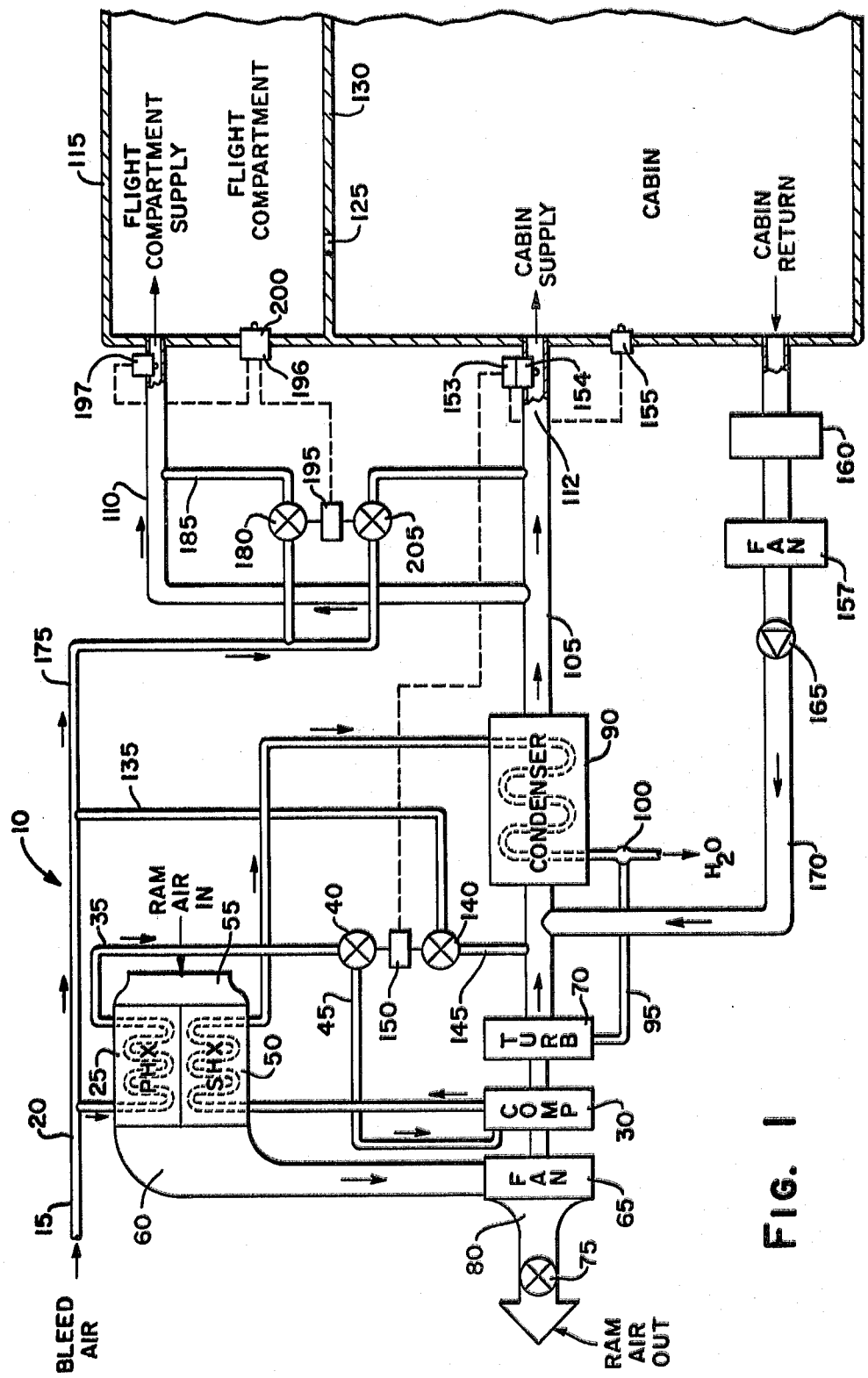
FIG. 1 is a schematic representation of the air cycle refrigeration system of the present invention.

Referring to FIG. 1, the air cycle refrigeration of the present invention is shown generally at 10. The system is supplied with air such as bleed air from the compressor section of the gas turbine engine through inlet line 15. The supply airflow is split at 20, a portion of the supply air being channeled through a primary heat exchanger (PHX) 25 where the air is cooled by a flow of ambient air such as engine ram air therethrough. Following discharge from the primary heat exchanger, the air cooled therein is channeled to the system's compressor 30 through line 35, control valve 40 and line 45. In the compressor, the air is compressed with a resultant heating thereof, the compressed air then being cooled in a secondary heat exchanger (SHX) 50 by ambient air such as the engine ram air noted hereinabove. As shown, primary and secondary heat exchangers 25 and 50 may be housed in a single unit, ram air being supplied thereto through inlet 55. Upon discharge from heat exchangers 25 and 50, the ram air is channeled through duct 60 at the termination of which a fan 65 may be provided to maintain the continuity of airflow through the primary and secondary heat exchangers. Fan 65 as shown, may be driven with compressor 30 by the air conditioning system's expansion turbine 70. A flow control valve 75 disposed in fan outlet duct 80 may be employed to control the flow of cooling air through heat exchangers 25 and 50.

If desired, for purposes of removing water vapor from the compressor discharge air, that air, after exiting secondary heat exchanger 50, may be fed through line 85 to condenser 90 from which the air is fed to the inlet of turbine 70 through line 95. A drain 100 disposed, for example, in line 95 provides a means for discharging condensed water from condenser 90. The air provided to the turbine performs work on the turbine in the usual manner, turning the rotor thereof, thereby causing an expansion and cooling of the air which is then discharged from the turbine through condenser 90 for cooling and drying the turbine inlet air in the manner set forth hereinabove. From the condenser, the turbine exhaust air is fed through lines 105 and 110 to a first zone of flight compartment 115 for pressurizing and cooling that zone. The flight compartment is vented to a second zone or cabin 120 through vent 125. Turbine exhaust is fed to cabin 120 directly through lines 105 and 112, line 112 being a continuation of line 105 downstream of the juncture of lines 105 and 110.

A portion of the uncooled supply air is channeled from inlet line 15 through line 135, valve 40 and line 140. At the termination of line 145, the inlet air is selectively added to the exhaust from turbine 70. Valves 40 and 140 are operated by an actuator 150 which simultaneously sets both valves to control the temperature of the air exhausted from the turbine. In the preferred embodiment, actuator 150 is responsive to controller 153 which itself responds to a signal provided thereto by turbine exhaust temperature sensor 154 in duct 112. Sensor 154 is shown for purposes of illustration in combination with the controller. The controller also responds to a signal provided thereto by cabin temperature sensor 155. A signal from controller 153 indicating an error between signals from sensor 154 and 155, causes actuator 150 to close valve 40 and open valve 140 to, in essence, partially short circuit the turbine exhaust when less cabin cooling is required. To increase cooling of the cabin, actuator 150 opens valve 40 while closing valve 140 to provide enhanced cooling by increasing the amount of airflow through the turbine.

Icing in the turbine exhaust may be minimized by recirculation of cabin air by fan 157 through filter 160 and check valve 165 in line 170.

To provide temperature control in one of the zones such as flight compartment 115, uncooled system inlet air is selectively mixed with the turbine exhaust air provided to this zone through line 110. Such inlet air is supplied to line 110 through line 175 and a first (flight compartment) trim valve 180 disposed in line 185 which communicates at the ends thereof with line 110 and 175. Valve 180 is operated by actuator 195. Actuator 195 is activated by controller 196 which is responsive to signals provided thereto from temperature sensors 197 and 200 in duct 110 and the flight compartment, respectively. An error between the signals from these sensors indicative of a requirement for a reduction in flight compartment cooling causes actuator 195 to further open trim valve 180 to admit increasing amounts of uncooled supply air to duct 110. Similarly, signals from sensors 197 and 200 indicating that increased flight compartment cooling is required, cause actuator 195 to partially close trim valve 180.

As set forth hereinabove, it is often required to provide both zones (the flight compartment and cabin) with independent temperature control with a minimum of component part duplication. In accordance with the present invention, such independent control is achieved by a second (cabin) trim valve 205 disposed in line 175 and operated with trim valve 180 by common actuator 195 for controlling the amount of uncooled supply air admitted to line 112 from line 175.

Figure 2:
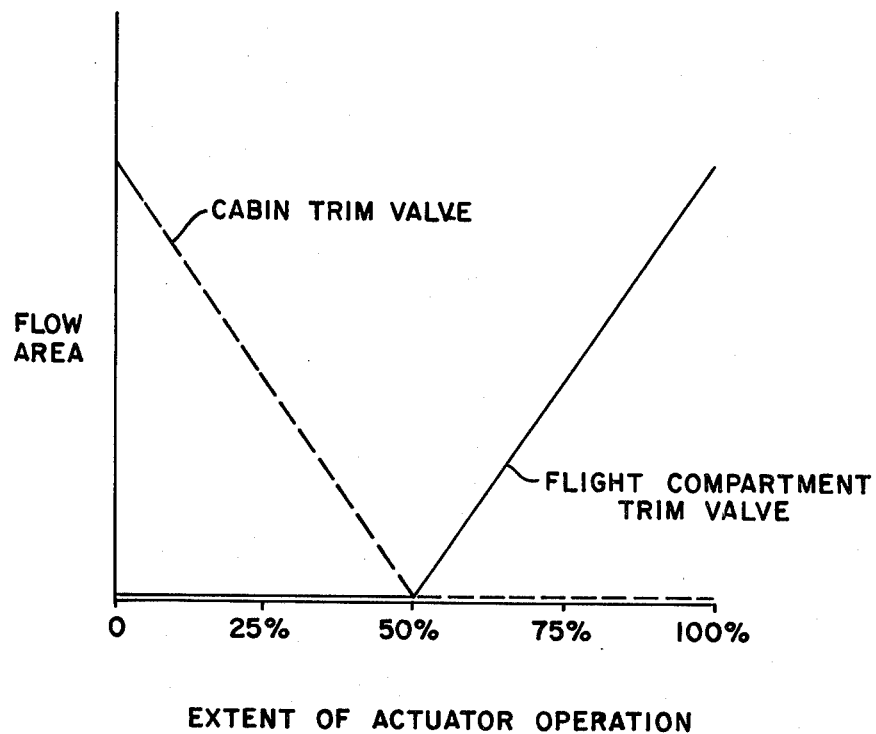
FIG. 2 is a graphical representation of the relationship between operation of the trim valves employed in the system of FIG. 1 and the single actuator which sets the valves.

Referring to FIG. 2, the relationship of the operation of actuator 195 and the flow area through flight compartment trim valve 180 and cabin trim valve 205 is shown. It is seen that actuator 195 effects a gradual opening of each of the trim valves while the other remains closed. Thus, it is seen that when the cabin trim valve is fully opened, the flight compartment trim valve is closed. Operation of the actuator gradually closes the cabin trim valve while the flight compartment trim valve is maintained fully closed until the actuator fully closes the cabin trim valve at which point both valves are closed. Further operation of the actuator gradually opens the flight compartment trim valve while maintaining the cabin trim valve fully closed.

The arrangement of the cabin and flight compartment trim valves, the turbine exhaust temperature control valves 40 and 140 and the actuators and sensors associated therewith provide independent temperature control of both the flight compartment and cabin without necessitating individual actuation of the trim valves. This is best seen by an exemplary description of the operation of the system. Assuming the actuator is at 50% of the extent of its operation, both trim valves are closed. If the flight compartment is too cold, flight compartment trim valve 180 is opened to admit increased quantities of uncooled supply air to line 110 without disturbing the interior cabin temperature. If, on the other hand, the flight compartment is too warm and the trim valve therefor is in an open state, the trim valve is gradually closed. If complete closure of this trim valve fails to cool the flight compartment sufficiently, the actuator continues to operate thereby maintaining the flight compartment trim valve closed while opening the cabin trim valve. This adds uncooled supply air to the cabin supply which alone would warm the cabin. However, any warming of the cabin supply air is sensed by sensor 154 which in turn causes controller 153 to operate actuator 150, adjusting the setting of valves 40 and 140 to lower the temperature in duct 105 and thereby maintain the constant desired cabin supply temperature.

While a particular embodiment of this invention has been shown, it will be appreciated that alternate equivalent embodiments may suggest themselves to those skilled in the art. For example, while only two independent zones have been shown, it will be appreciated that additional zones may be provided without departing from this invention. Moreover, limits may be placed on the sensors and/or actuators to prevent icing in the system's turbine exhaust air. Thus, in the example given hereinabove, sensor 197 or actuator 195 may be provided with suitable limits to prevent turbine exhaust air from being driven to below a predetermined temperature when sensor 197 is controlling the exhaust air temperature in the manner set forth herein. Likewise, sensor 154 or actuator 150 may be provided with a suitable stop to prevent the air conditioning system's exhaust air from falling below a predetermined temperature to prevent icing when sensor 154 calls for increased cooling of the cabin.

Having thus described the invention what is claimed is:

1. An air cycle refrigeration system wherein pressurized air received by said system is expanded and cooled in a turbine and exhausted therefrom to first and second zones, said refrigeration system including control valve means for regulating the temperature of air exhausted from said turbine in response to the temperature of air supplied to said second zone, a first conduit providing uncooled air for mixture with said cooled air supplied to said first zone and a first trim valve communicating with said first conduit for regulating the flow of uncooled air to said first zone for regulation of the temperature thereof, said air cycle refrigeration system being characterized by:

a second conduit providing uncooled air for mixture with said cooled air supplied to said second zone;

a second trim valve communicating with said second conduit for regulating the flow of uncooled air to said second zone for the regulation of the temperature thereof; and an actuator operating both said first and second trim valves in response to the temperature of said first zone, and effecting an opening of each of said trim valve while the other remains closed for maintenance of desired temperature in said first and second zones by direct control of said first and second trim valves to adjust the mixture of uncooled air with cooled air admitted to said first and second zones and indirect control of said control valve means by adjustment of the temperature of air supplied to said second zone.

2. The air cycle refrigeration system of claim 1 further characterized by the operation of said actuator being that of gradually closing said second trim valve from an open position thereof while said first trim valve is maintained in a closed position, followed by a gradual opening of said first trim valve while said second trim valve remains closed.

* * * * *